United States Patent [19]
Watts et al.

[11] Patent Number: 5,619,199
[45] Date of Patent: Apr. 8, 1997

[54] ORDER PRESERVING RUN LENGTH ENCODING WITH COMPRESSION CODEWORD EXTRACTION FOR COMPARISONS

[75] Inventors: Steven J. Watts; Balakrishna R. Iyer, both of San Jose, Calif.

[73] Assignee: International Business Machines Corporation, Armonk, N.Y.

[21] Appl. No.: 434,775

[22] Filed: May 4, 1995

[51] Int. Cl.[6] ...................................................... G06F 17/30
[52] U.S. Cl. .............................. 341/51; 395/603; 341/67; 364/715.02; 364/222.9; 364/DIG. 1
[58] Field of Search ............................... 395/600; 341/51, 341/67; 364/715.02

[56] References Cited

U.S. PATENT DOCUMENTS

| | | | |
|---|---|---|---|
| 4,464,650 | 8/1984 | Eastman et al. | 341/51 |
| 5,153,591 | 10/1992 | Clark | 341/51 |
| 5,270,712 | 12/1993 | Iyer et al. | |
| 5,298,895 | 3/1994 | Van Maren | 341/51 |
| 5,463,390 | 10/1995 | Whiting et al. | 341/51 |
| 5,532,694 | 7/1996 | Mayers et al. | 341/51 |

*Primary Examiner*—Wayne Amsbury
*Attorney, Agent, or Firm*—Sterne, Kessler, Goldstein & Fox P.L.L.C.; Marilyn Smith Dawkins, Esq.

[57] ABSTRACT

The present invention provides a system and method for the dictionary ordering of keys after expansion, compression and concatenation of their key parts. After each key part has been expanded through padding, each substring of identical characters of length greater than or equal to three is compressed through run-length encoding algorithm. The substring is replaced by the sequence character, a compression identifying character and a number identifying the number of characters being replaced. After compression and the subsequent concatenation, the keys are compared character by character. At the first instance of a miscomparison, the comparison scheme performs a normal dictionary ordering if neither of the characters are part of a compression sequence. If a character at the point of miscomparison is part of a compression sequence then an ordering decision is made based on the compression character, the length of the compressed substring and the character following the compressed substring.

35 Claims, 3 Drawing Sheets

ORDER PRESERVING RUN LENGTH ENCODING WITH COMPRESSION CODEWORD EXTRACTION FOR COMPARISONS

TECHNICAL FIELD

The present invention relates generally to database management systems and methods for comparing two keys in dictionary order. More specifically, this invention provides a method for comparing keys with variable length key parts that have been expanded, compressed and concatenated into a single string.

BACKGROUND ART

To locate a key (or record) contained within an index, the value of that key, hereinafter referred to as the search key, is used to guide the search (or traversal) through an index tree. At every level of index tree traversal, the search key is compared to the key values within a particular node to determine the next step of traversal. If the key values are numerical, then the comparison merely involves a determination of whether the search key is greater than or less than the key within the node. If the key values are character strings, then a comparison would require a dictionary ordering of the two key values to determine which is "greater" than the other.

To allow for dictionary ordering of keys, where the keys may consist of more than one field or key part (e.g., order by lastname, firstname), conventional systems designers had to decide whether to sacrifice CPU time or disk space. One approach compares each key part individually with the corresponding key part in the other key, implicitly adding blanks to the shorter of the two key parts. This process of identifying the variable length of the two keys, however, serves to increase the CPU usage.

In another method, each key part is expanded to its maximum length by the padding of the key part with blanks. The expanded key parts are then concatenated into a single string for comparison. Clearly, the increase in disk space required for the padded blanks serves as a limiting factor to the key part expansion and concatenation technique. Therefore, what is required is a compression technique that offsets the increase in disk space required for storage of expanded and concatenated keys while also preserving the ability to perform dictionary ordering of the compressed keys.

The foregoing and other objects, features and advantages of the invention will be apparent from the following more particular description of (a) preferred embodiment(s) of the invention, as illustrated in the accompanying drawing(s).

DISCLOSURE OF INVENTION

The present invention addresses the drawbacks of the conventional approaches by providing a system and method for the dictionary ordering of keys which contain expanded, compressed and concatenated key parts. After each key part has been expanded through the padding of blanks up to a maximum length, the expanded key part is scanned to identify any substring of identical characters of length greater than or equal to three. These substrings are compressed through a run length encoding algorithm and replaced by a three character sequence. This sequence comprises the compressed character, a compression identifying character (e.g., the "escape" character), and a number identifying the number of characters being replaced. The "escape" character is preferably not part of the character set but may be chosen to be a character that is infrequently used. If the compression identifying character is chosen to be part of the character set, then each time an n-length substring of compression identifying characters appears as part of the key part prior to compression it must be compressed as a substring of length n ($n \geq 1$).

Once the key parts have been compressed and concatenated as a single string, the two keys are compared character by character. At the first instance of a miscomparison, the comparison scheme determines if either of the characters at the point of miscomparison is part of a compressed sequence. If not, a normal dictionary ordering follows and the comparison is complete. If a character at the point of miscomparison is part of a compressed sequence, then an ordering decision is made based on the compression character, the length of the compressed substring and the character following the compressed substring.

BRIEF DESCRIPTION OF DRAWINGS

The foregoing and other features and advantages of the invention will be apparent from the following, more particular description of a preferred embodiment of the invention, as illustrated in the accompanying drawings.

The preferred embodiment of the invention is now described with reference to the figures where like reference numbers indicate like elements. Also in the figures, the left most digits of each reference number corresponds to the figure in which the reference number is first used.

BEST MODE FOR CARRYING OUT THE INVENTION

The preferred embodiment of the invention is discussed in detail below. While specific part numbers and/or configurations are discussed, it should be understood that this is done for illustration purposes only. After reading the following description, it will become apparent to a person skilled in the relevant art that other components and configurations may be used without parting from the spirit and scope of the invention.

The present invention applies generally to any system and method of comparing two character strings. An example of an application of this comparison process resides within a database system comprising one or more processors connected to one or more electronic storage devices, such as disk drives, on which one or more databases are stored. In support of various search and retrieval functions against the database system, a dictionary ordering scheme organizes the character strings (or keys) within an index. Where the keys comprise multiple key parts (e.g., last name, first name) of varying length, either implicit or explicit padding with blanks is performed. In one embodiment, the explicitly padded key parts are compressed through run-length encoding and subsequently concatenated. Although substrings of identical characters have been replaced by codewords, the present invention allows a modified dictionary ordering process to compare the two compressed keys.

Figure 1:
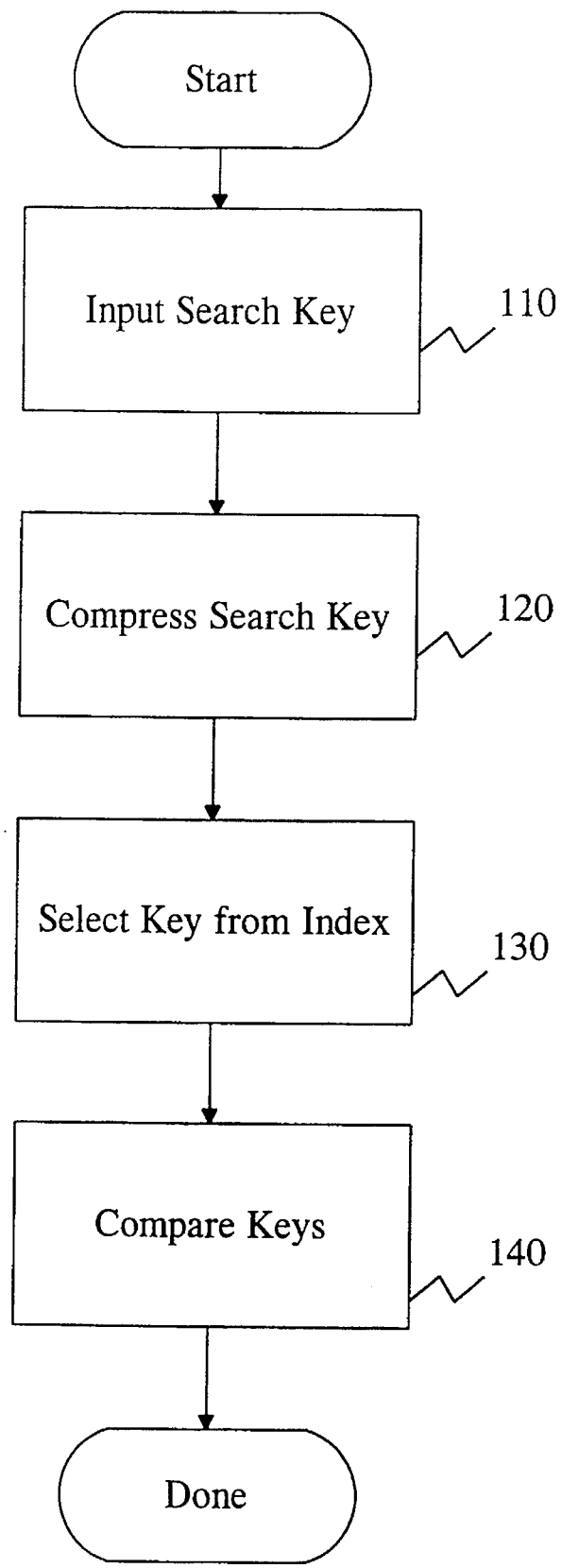
FIG. 1 shows a flow diagram depicting an index search method incorporating compression of the search key.

FIG. 1 illustrates an example of the present invention's application to a database index tree search. Here, a search key is compared to the keys within the nodes of the index tree to determine the path of traversal through the index tree. As shown, the process comprises the steps of inputting the search key 110, compressing and concatenating the search key 120, selecting a key from the index for comparison 130, and comparing the two keys 140. The critical steps within this particular example are the steps of compression 120 and comparison 140 that retain dictionary ordering capabilities for run-length encoded character strings. The following description describes both of these steps in detail.

Referring to Table 1, there is shown a run-length encoding algorithm that replaces any string of identical characters with a codeword. The codeword comprises a compressed character, a compression identifying character (preferably any character not part of the character subset), and a number identifying the number of characters being replaced. Hereinafter, for descriptive purposes only, it is assumed that the "escape" character (<ESC>) represents the compression identifying character. As shown by the first example of Table 1, a string of ten "A"s is replaced by "A <ESC>9". Note in this example, where the maximum length is equal to twelve characters, two blanks are inserted after the string of "A"s to pad the key part to its maximum length. Similarly, in the second example, the seven padded blanks are replaced by "<blank><ESC>6".

position. The first position at which the keys differ is defined as the point of miscomparison.

After the detection of a miscomparison by step 210, step 220 determines, for each key, whether either of the characters at the point of miscomparison is part of a codeword replacing a substring of identical characters. This determination is made by identifying whether the "escape" character is in the position of miscomparison or in the position previous to the position of miscomparison. If the "escape" character does not appear in either position, no codewords exist at the point of miscomparison and a normal dictionary ordering can proceed in step 260. This scenario is exemplified by case 1 below where an ordinary dictionary ordering is performed between "A" and "B", the characters at the point of miscomparison.

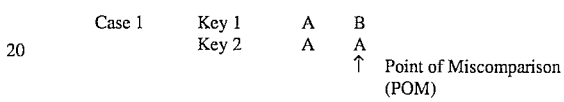

If the "escape" character does exist in one of the two positions in either key, then a codeword exists at the point of miscomparison and step 230 identifies the character being compressed (designated the compressed character). The examples in case 2 below illustrate the desired function of step 230.

TABLE 1

| Example | Key | Padded Key | Compressed Key |
|---------|-----|------------|----------------|
| 1 | 'AAAAAAAAAA' | 'AAAAAAAAAAxx' | 'A\9xx' |
| 2 | 'WATTS' | 'WATTSxxxxxxx' | 'WATTSx\6' |
| 3 | 'SLATER\WATTS' | 'SLATER\WATTS' | 'SLATER\\0WATTS' |

Maximum Length = 12; Escape = "\"; Blank = "x"

To promote efficient compression in these examples, a string of identical characters having a length less than three would not be compressed. Clearly, for an embodiment wherein the codeword replacing a compressed substring contains three characters, the disk space requirement is increased. If a string of three identical characters is found, the decision whether to compress is dictated by the specific method and sequence of processing within the comparison process. The gains exist not as disk space reduction but in processing efficiency.

As an exception to the efficiency increase described above, when the "escape" character is part of the character set, each n-length substring of "escape" characters must be run-length encoded as a substring of length n (n≧1). Example 3 of Table 1 illustrates the compression of the "escape" character with "<ESC><ESC>0". In this case, the length of the key part would necessarily increase in length due to compression. However, due to its infrequency, the additional disk space requirements are minimal.

Figure 2:
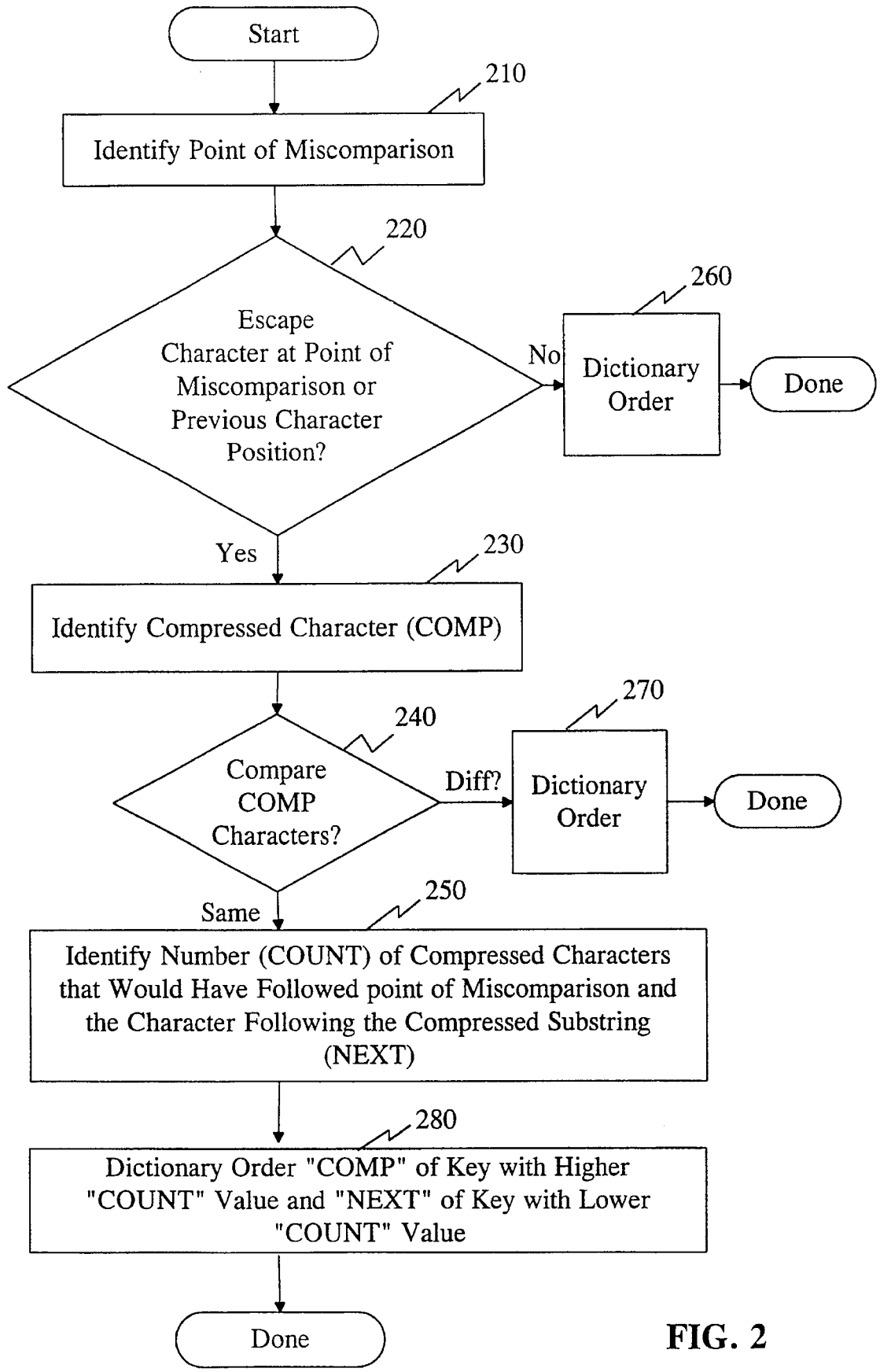
FIG. 2 shows a flow diagram depicting a method of comparing keys that have been expanded, compressed and concatenated.

Referring to FIG. 2, there is shown a method for comparing two keys after their key parts have been expanded (padded), compressed, and concatenated for comparison. In this embodiment, it is assumed that the "escape" character is not part of the character set.

The dictionary ordering process in FIG. 2 begins in step 210 where the point of miscomparison is determined. Typically, this is accomplished by performing a character-to-character comparison starting from the left most character

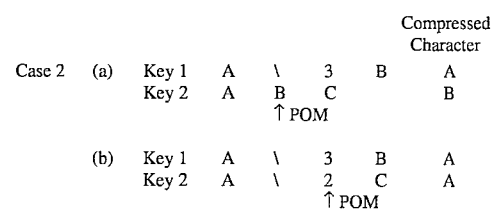

For key 1 of case 2(a), the escape character at the point of miscomparison indicates the existence of a codeword at the point of miscomparison. Step 230 must then identify the character being compressed. For this example, the compressed character resides in the position previous to the point of miscomparison and is equal to "A".

For key 1 and key 2 of case 2(b), the escape character at the position previous to the point of miscomparison indicates that the compressed character resides at two positions prior to the point of miscomparison. In these examples, step 230 would identify the compressed character as "A". Key 2 of case 2(a) illustrates the scenario where a codeword does not exist at the point of miscomparison. For this example, the compressed character is represented by the character at the point of miscomparison (i.e., effectively a compressed codeword of length zero).

The rules of decision for step 230 can be summarized by the following relations that define the value of the compressed character ("comp") based on the characters at the point of miscomparison ("char"), the position previous to the point of miscomparison ("char−1"), and two positions previous to the point of miscomparison ("char−2").

(1) IF "char" not="escape" AND "char−1" not="escape" THEN "comp"="char [key 2 of Case 2(a)]

(2) IF "char"="escape" THEN "comp"="char−1" [key 1 of Case 2(a)], and (3) IF "char−1"="escape" THEN "comp"="char−2" [key 1 and key 2 of Case 2(b)].

Effectively, these relations identify the first character in the codeword (or the compressed character). If a key does not have a codeword at the point of miscomparison, then the "comp" value is simply the character at the point of miscomparison [e.g., key 2 of case 2(a)].

Once the "comp" values for both keys are established, step 240 determines whether the "comp" values are different. If the "comp" values are different, a normal dictionary ordering of the "comp" values is performed in step 270 and the ordering process is completed.

If the "comp" values are equivalent, then the length of the compressed substring of characters following ("count") and the character following the codeword ("next") must be determined for each key. The examples in case 3 below illustrate these concepts.

|         |     |       |   |   |   |   | Comp | Count | Next |
|---------|-----|-------|---|---|---|---|------|-------|------|
| Case 3  | (a) | Key 1 | A | \ | 5 | B | A    | 5     | B    |
|         |     | Key 2 | A | \ | 3 | C | A    | 3     | C    |
|         |     |       |   |   | ↑POM |   |      |       |      |
|         | (a')| Key 1 | A A A A A A B |   |   |   |      |       |      |
|         |     | Key 2 | A A A A C |   |   |   |      |       |      |
|         |     |       |       ↑POM |   |   |   |      |       |      |
|         | (b) | Key 1 | A | \ | 3 | B | A    | 3     | B    |
|         |     | Key 2 | A | A | C |   | A    | 0     | C    |
|         |     |       |   |   ↑POM |   |   |      |       |      |

As cases 3(a) and 3(a') illustrate, key 1 of case 3(a) is equivalent to key 1 of case 3(a') and key 2 of case 3 (a) is equivalent to key 2 of case 3(a'). Since the "comp" values are equivalent, the way to distinguish the two keys is by determining which of the codewords represent the longer of the two compressed substrings. For this example, key 1 has a compressed substring of length 5 while key 2 has a compressed substring of length 3. This indicates that the effective point of miscomparison will involve a comparison between the compressed character of key 1 ("A") with the character following the codeword in key 2 ("C").

This rule of comparison can be stated as follows: when two keys have the same "comp" values, the dictionary ordering is performed between the "comp" value of the key with larger "count" value to the "next" value of the key with the smaller "count" value. In other words, for case 3(a), comparing the "comp" value of key 1 with the "next" value of key 2, simulates the direct comparison that would occur at character position 5 if key 1 and key 2 were not compressed.

To implement this rule, both the "count" value and the "next" value for each key must be determined. Step 250 identifies the "count" and "next" values for each key through the following relations:

(1) IF "char" not="escape" AND "char−1" not="escape" THEN "count"=0 and "next"="char+1" [key 2 of Case 3(b)], (2) IF "char−1="escape" THEN "count"="char" and "next"="char+1" [key 1 or key 2 of Case 3(a)], and (3) IF "char"="escape" THEN "count"="char+1"and "next"="char+2" [key 1 of Case 3(b)].

Once the "count" and "next" values for each key are determined, the rule of comparison is implemented in step 280 which also dictionary orders the two keys. Again, the "comp" character of the key with the higher "count" value is compared to the "next" character of the key having the lower count value. For both case 3(a) and 3(b), the comparison amounts to a dictionary ordering of the "comp" value of key 1 to the "next" value of key 2.

Figure 3:
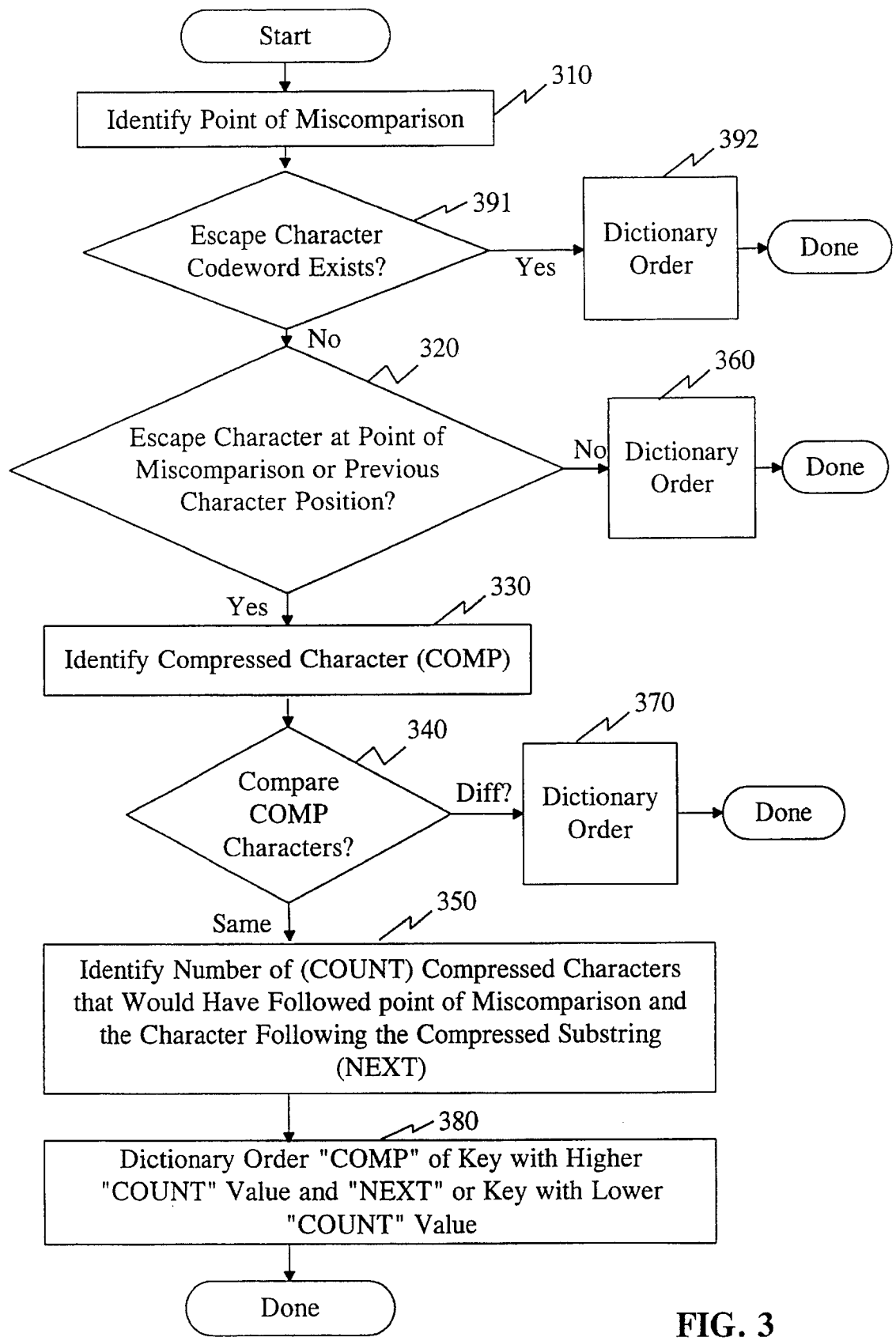
FIG. 3 shows a flow diagram depicting an alternative method of comparing keys that have been expanded, compressed and concatenated.

In an alternative embodiment, the compression identifying character ("escape") is chosen from the character set. FIG. 3 illustrates the sequence of processing that requires additional steps 391 and 392. Each processing step other than steps 391 and 392 is identical to its counterpart in FIG. 2 and will not be described in detail.

After the point of miscomparison is identified in step 310, step 391 identifies whether one of the characters at the point of miscomparison is the start of a codeword (i.e., "<ESC><ESC>n") used to compress the "escape" character. Case 4 below illustrates this example.

| Case 4 | Key 1 | A | B | C |   |
|--------|-------|---|---|---|---|
|        | Key 2 | A | \ | \ | 2 |
|        |       |   | ↑POM |   |   |

To identify this specific codeword, step 391 determines if the character at the point of miscomparison ("char") AND the character in the position after the point of miscomparison ("char+1") are both "escape" characters. If either key 1 or key 2 satisfy this condition, step 392 performs a dictionary ordering between the "escape" character and its miscompared counterpart ("B" in key 1 of Case 4), thus completing the process.

The necessity of the inclusion of these steps at the beginning of the comparison process becomes apparent when considering the definitional relations utilized by steps 230, and 330 Specifically, if the scenario wherein the codeword for the "escape" character was not addressed prior to these steps, the relation:

IF "char"="escape" THEN "comp"="char−1" is invalid (see key 2 of case 4).

While the invention has been particularly shown and described with reference to preferred embodiments thereof, it will be apparent to those skilled in the relevant art that various changes in form and details may be made therein without departing from the spirit and scope of the invention.

Having thus described our invention, what we claim as new and desire to secure by Letters Patent is:

1. A method of finding a search key in a database index, wherein each key within the database index comprises a plurality of key parts of varying length and each of the plurality of key parts comprises a plurality of characters, the method comprising the steps of:

(a) concatenating the key parts of the search key that are compressed through run-length encoding to produce a compressed search key;

(b) comparing said compressed search key to a key from the database index to identify a point of miscomparison; and (c) ordering said compressed search key and the key from the database index based on characters at the point of miscomparison, characters at the two character positions prior to said point of miscomparison and characters at the two character positions after said point of miscomparison.

2. The method of claim 1, further comprising the step of replacing a substring of identical characters within the search key with a run-length encoded codeword comprising a compressed character, a compression identifying character and a number identifying the number of characters that are replaced.

3. The method of claim 2, wherein said compression identifying character is a character in the character set that is infrequently used.

4. The method of claim 3, wherein an n-length substring (n≧1) of said compression identifying characters is always compressed to represent a substring of length n.

5. The method of claim 4, further comprising the step of identifying whether the character at the point of miscomparison is part of a codeword representing a substring of compression identifying characters.

6. The method of claim 2, wherein the step of ordering further comprises the steps of:
   (1) identifying whether the character at the point of miscomparison is part of a run-length encoded codeword;
   (2) identifying said compressed character of said compressed substring;
   (3) identifying a count value representing the number of compressed characters that follows said point of miscomparison;
   (4) identifying the next character following said run-length encoded codeword; and
   (5) comparing said compressed character of the key with a higher count value to the next character of the key with a lower count value.

7. A method of comparing character strings that are compressed through run length encoding, the method comprising the steps of:
   (a) comparing the compressed character strings to identify a point of miscomparison; and
   (b) ordering said compressed character strings based on characters at the point of miscomparison, characters at the two character positions prior to said point of miscomparison and characters at the two character positions after said point of miscomparison.

8. The method of claim 7, further comprising the step of replacing a substring of identical characters within the character string with a run-length encoded codeword comprising a compressed character, a compression identifying character and a number identifying the number of characters that are replaced.

9. The method of claim 8, wherein said compression identifying character is a character in the character set that is infrequently used.

10. The method of claim 9, wherein an n-length substring (n≧1) of said compression identifying characters is always compressed to represent a substring of length n.

11. The method of claim 10, further comprising the step of identifying whether the character at the point of miscomparison is part of a codeword representing a substring of compression identifying characters.

12. The method of claim 8, wherein the step of ordering further comprises the steps of:
   (1) identifying whether the character at the point of miscomparison is part of a run-length encoded codeword;
   (2) identifying said compressed character of said compressed substring;
   (3) identifying a count value representing the number of compressed characters that follows said point of miscomparison;
   (4) identifying the next character following said run-length encoded codeword; and
   (5) comparing said compressed character of the key with a higher count value to the next character of the key with a lower count value.

13. A computer based system for finding a search key in a database index, wherein each key within the database index comprises a plurality of key parts of varying length and each of the plurality of key parts comprises a plurality of characters, the system comprising:
   (a) means for concatenating the key parts of the search key that are compressed through run-length encoding to produce a compressed search key;
   (b) means for comparing said compressed search key to a key from the database index to identify a point of miscomparison; and
   (c) means for ordering the search key and the key from the database index based on the characters at the point of miscomparison, the characters at the two character positions prior to said point of miscomparison and characters at the two character positions after said point of miscomparison.

14. The system of claim 13, further comprising means for replacing a substring of identical characters within the search key with a run-length encoded codeword comprising a compressed character, a compression identifying character and a number identifying the number of characters being replaced.

15. The system of claim 14, wherein said compression identifying character is a character in the character set that is infrequently used.

16. The system of claim 15, wherein an n-length substring (n≧1) of said compression identifying characters is always compressed to represent a substring of length n.

17. The system of claim 16, further comprising means for identifying whether the character at the point of miscomparison is part of a codeword representing a substring of compression identifying characters.

18. The system of claim 14, wherein the means for ordering further comprises:
   (1) means for identifying whether the character at the point of miscomparison is part of a run-length encoded codeword;
   (2) means for identifying said compressed character of said compressed substring, a count value representing the number of compressed characters that follows said point of miscomparison, and the next character following said run-length encoded codeword; and
   (3) means for comparing said compressed character of the key with a higher count value to the next character of the key with a lower count value.

19. A system for comparing character strings that are compressed through run length encoding, the system comprising:
   (a) means for comparing the compressed character strings to identify a point of miscomparison; and
   (b) means for ordering the compressed character strings based on characters at the point of miscomparison, characters at the two character positions prior to said point of miscomparison and characters at the two character positions after said point of miscomparison.

20. The system of claim 19, wherein a substring of identical characters within the character string is replaced with a run-length encoded codeword comprising a compressed character, a compression identifying character and a number identifying the number of characters being replaced.

21. The system of claim 20, wherein said compression identifying character is a character in the character set that is infrequently used.

22. The system of claim 21, wherein an n-length substring (n≧1) of said compression identifying character is always compressed to represent a substring of length n.

23. The system of claim 22, further comprising means for identifying whether the character at the point of miscomparison is part of a codeword representing a substring of compression identifying characters.

24. The system of claim 20, wherein the means for ordering further comprises:
   (1) means for identifying whether the character at the point of miscomparison is part of a run-length encoded codeword;
   (2) means for identifying said compressed character of said compressed substring, a count value representing the number of compressed characters that would follow said point of miscomparison, and the next character following said run-length encoded codeword; and
   (3) means for comparing said compressed character of the key with a higher count value to the next character of the key with a lower count value.

25. A method of comparing character strings that are compressed through run length encoding, wherein a string of identical characters is replaced with a compressed character, a compression identifying character and a number identifying the number of characters that are replaced, the method comprising the steps of:
   (a) comparing the compressed character strings to identify a point of miscomparison;
   (b) identifying for each character string whether a character at said point of miscomparison is part of a run-length encoded codeword;
   (c) identifying the compressed character for each run length encoded codeword; and
   (d) ordering the compressed character strings based on the compressed character value.

26. The method of claim 25, wherein an n-length substring (n≧1) of said compression identifying characters is always compressed to represent a substring of length n.

27. The method of claim 26, further comprising the step of identifying whether the character at said point of miscomparison is the start of a codeword representing a substring of said compression identifying character.

28. The method of claim 25, wherein the step of identifying whether a character at said point of miscomparison is part of a run-length encoded codeword further comprises the step of identifying whether the compression identifying character is at said point of miscomparison or at the position previous to said point of miscomparison.

29. The method of claim 25, further comprising the steps of:
   (e) identifying a count value representing the number of compressed characters that follows said point of miscomparison;
   (f) identifying the next character following said run-length encoded codeword; and
   (g) comparing the compressed character of the key with a higher count value to the next character of the key with a lower count value.

30. A system for comparing character strings that are compressed through run length encoding, wherein a string of identical characters is replaced with a compressed character, a compression identifying character and a number identifying the number of characters that are replaced, the system comprising:
   (a) means for comparing the compressed character strings to identify a point of miscomparison;
   (b) means for identifying for each character string whether a character at said point of miscomparison is part of a run-length encoded codeword;
   (c) means for identifying the compressed character for each run length encoded codeword; and
   (d) means for ordering the compressed character strings based on the compressed character value.

31. The method of claim 30, further comprising means for identifying whether the character at said point of miscomparison is the start of a codeword representing a substring of said compression identifying character.

32. The system of claim 30, further comprising means for:
   (e) identifying a count value representing the number of compressed characters that follows said point of miscomparison;
   (f) identifying the next character following said run-length encoded codeword; and
   (g) comparing the compressed character of the key with a higher count value to the next character of the key with a lower count value.

33. A computer program product having a computer readable medium comprising a controller to enable a processor to compare character strings that are compressed through run length encoding, the controller comprising:
   (a) means for enabling the processor to compare the compressed character strings to identify a point of miscomparison; and
   (b) means for enabling the processor to order the compressed character strings based on characters at the point of miscomparison, characters at the two character positions prior to said point of miscomparison and characters at the two character positions after said point of miscomparison.

34. A computer system comprising:
   (a) a processor;
   (b) a controller for enabling said processor to compare character strings that are compressed through run length encoding, comprising:
      (1) means for enabling said processor to compare the compressed character strings to identify a point of miscomparison; and
      (2) means for enabling said processor to order the compressed character strings based on characters at the point of miscomparison, characters at the two character positions prior to said point of miscomparison and characters at the two character positions after said point of miscomparison.

35. A controller for enabling a processor to compare character strings that are compressed through run length encoding, comprising:
   (a) means for enabling the controller to compare the compressed character strings to identify a point of miscomparison; and
   (b) means for enabling the controller to order the compressed character strings based on characters at the point of miscomparison, characters at the two character positions prior to said point of miscomparison and characters at the two character positions after said point of miscomparison.

* * * * *